United States Patent
Khotimsky et al.

(10) Patent No.: US 11,706,547 B2
(45) Date of Patent: *Jul. 18, 2023

(54) SYSTEMS AND METHODS FOR COLLISION RESOLUTION DURING ONU ACTIVATION

(71) Applicant: Verizon Patent and Licensing Inc., Basking Ridge, NJ (US)

(72) Inventors: Denis A. Khotimsky, Westborough, MA (US); Eugene DeFrancisci, Seaford, NY (US); Gregory K. Sherrill, Herndon, VA (US); Rajesh Yadav, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,406

(22) Filed: Feb. 21, 2022

(65) Prior Publication Data
US 2022/0174378 A1 Jun. 2, 2022

Related U.S. Application Data

(63) Continuation of application No. 17/095,914, filed on Nov. 12, 2020, now Pat. No. 11,272,271.

(51) Int. Cl.
*H04Q 11/00* (2006.01)

(52) U.S. Cl.
CPC . *H04Q 11/0062* (2013.01); *H04Q 2011/0064* (2013.01); *H04Q 2011/0086* (2013.01)

(58) Field of Classification Search
CPC .................................................. H04Q 11/0062
See application file for complete search history.

(56) References Cited

U.S. PATENT DOCUMENTS

| | | | | |
|---|---|---|---|---|
| 7,428,586 B2 * | 9/2008 | Sutherland | ............ | H04L 12/413 709/224 |
| 11,272,271 B1 * | 3/2022 | Khotimsky | ........ | H04Q 11/0062 |
| 2006/0187951 A1 * | 8/2006 | Ginzburg | ............ | H04W 74/085 370/445 |
| 2013/0094861 A1 | 4/2013 | Luo et al. | | |
| 2019/0238246 A1 | 8/2019 | Zhang | | |

(Continued)

OTHER PUBLICATIONS

Ali et al., "A Self-Scrutinized Backoff Mechanism for IEEE 802.11ax in 5G Unlicensed Networks", Sustainability, 2018 (Year: 2018).*

(Continued)

*Primary Examiner* — Shi K Li

(57) ABSTRACT

An optical device may include a communication interface and processing logic configured to receive a broadcast contention-based allocation from an optical line terminal (OLT), wherein the contention-based allocation is associated with activation of the optical device in an optical network. The processing logic may also be configured to transmit a message in response to the contention-based allocation, wherein the message includes information identifying the optical device and receive, from the OLT, an assignment message or a feedback message in response to the transmitted message. The processing logic may be further configured to execute a retransmission procedure based on the assignment or feedback message indicating that a collision occurred.

20 Claims, 11 Drawing Sheets

(56) References Cited

U.S. PATENT DOCUMENTS

2020/0295845 A1     9/2020   Funada et al.
2020/0350992 A1*   11/2020   Liu ........................ H04B 10/27

OTHER PUBLICATIONS

Kramer, et al., "A proposal to decouple connectivity from media access", Aug. 2016, downloaded from www.ieee802.org (Year: 2016).

* cited by examiner

SYSTEMS AND METHODS FOR COLLISION RESOLUTION DURING ONU ACTIVATION

RELATED APPLICATION

This patent application is a Continuation of U.S. application Ser. No. 17/095,914 filed on Nov. 12, 2020, titled "Systems and Methods for Collision Resolution During ONU Activation," the disclosure of which is hereby incorporated by reference herein in its entirety.

BACKGROUND

A Passive Optical Network (PON) system is an optical access network that is typically based on a point-to-multipoint (P2MP) optical fiber topology, known as an optical distribution network (ODN). An ODN uses fiber and passive components, such as splitters and combiners. A PON system uses the ODN to provide connectivity between a number of central nodes and a number of user nodes using bi-directional wavelength channels. Operation of the PON system in the upstream direction from user nodes to the central nodes typically utilizes principles of Time-Division Multiple Access (TDMA) for each wavelength channel. For example, each user node is granted or allocated an upstream transmission opportunity within a tightly controlled time interval.

In response to a grant of a transmission opportunity, also referred to as an allocation, a user node turns on its optical transmitter, transmits a burst of data along with Operations and Maintenance (O&M) information, and then turns off its transmitter until the next transmission opportunity is granted. The transmission opportunity can be granted to a specific individual node (a directed grant, or allocation) or to a group of nodes to perform a specific function, such as activation of an optical network unit (ONU) operating at a specific combination of upstream and downstream line rates (a contention-based grant, or allocation). The transmission opportunities are granted to the user nodes or groups of user nodes by the central node, for example, by use of a bandwidth map.

In a conventional PON system, the central node may grant allocations having a specific allocation identifier (referred to as an Alloc-ID). An Alloc-ID is a specific number assigned to one or more allocations granted to one specific user node or one specific function. In conventional PON systems, there are typically two classes of Alloc-IDs: dedicated Alloc-IDs which are assigned to an individual user node, and broadcast (also referred to as contention-based) Alloc-IDs, which are assigned to a specific contention-based function.

One contention-based function that requires an assignment of contention-based Alloc-IDs is user node activation, also referred to as ONU activation. ONU activation typically involves a set of distributed procedures executed by a central node (e.g., an optical line terminal channel termination (OLT CT) device) and the ONU when the ONU is first installed in the PON system, or each time the ONU is reinitialized due to a power cycle, a command received from the OLT CT device, or an internal condition. In a conventional PON, at the start of the ONU activation, the ONU does not have a specific link layer address, known as an ONU-ID. Therefore, the ONU cannot use any dedicated Alloc-ID and declares its presence on the PON by responding to a contention-based allocation that is assigned to the activation function.

When responding to a contention-based allocation, multiple ONUs may attempt to respond concurrently to the same allocation. Whenever two or more transmissions by ONUs overlap in time with respect to their arrival at the central node, the transmissions are involved in a collision. Such collisions result in corrupted data that is not usable. In other words, the transmissions from the ONUs are not able to be successfully decoded at the OLT CT, causing the ONUs to have to retransmit the data. Conventional PON systems attempt to mitigate collisions between activating user nodes by means of randomization. That is, the timing of each user node transmission may be randomized within a window of opportunity such that multiple ONUs are less likely to be transmitting at the same or overlapping times, thereby reducing the probability of collision.

DETAILED DESCRIPTION OF EXAMPLE EMBODIMENTS

The following detailed description refers to the accompanying drawings. The same reference numbers in different drawings may identify the same or similar elements.

As described above, in conventional PON systems, randomization may be used to try to reduce the possibility of a collision. The term "collision" as used herein should refers to transmissions from two or more user nodes (e.g., ONUs) that overlap in time from the perspective of a receiver device (e.g., an optical line terminal channel termination device) that receives the transmissions. As the line rate of a PON system increases, the relative duration of user node transmissions for activation purposes generally increases. As a result, to maintain a low probability of collision, the activation transmission window may need to be substantially increased, which may adversely impact data throughput of the system and the quality of service due to service interruption associated with the activation transmission window. Alternatively, if the duration of the activation transmission window remains substantially the same, the number of retransmissions necessary to activate the user nodes increases. In certain conditions, the activations may reach a point in which multiple user nodes attempt to activate repeatedly, but no user node succeeds. This adverse effect may be exacerbated by an event that impacts the entire PON system, such as a reboot of the central node that may lead to large number of user nodes attempting to activate at the same time, thus significantly raising the probability of collisions.

Implementations described herein provide systems and methods to perform collision resolution upon ONU activation in a PON system by controlling the retransmissions by activating user nodes (e.g., ONUs). For example, in one implementation, a central node (e.g., OLT CT) provides feedback to ONUs attempting to activate regarding the success or failure of an activation. The ONUs may then execute particular procedures associated with determining when to perform a retransmission associated with activation. In an exemplary implementation, by using a same set of procedures or protocols performed at all ONUs in response to the feedback from the central node, each activating ONU is effectively guaranteed that ONU activation will be successful, regardless of the number of simultaneously activating ONUs. Further, implementations described herein also reduce the average probability of collisions in each contention-based allocation associated with the user node activation function, resulting in improved efficiency in the PON.

Figure 1:
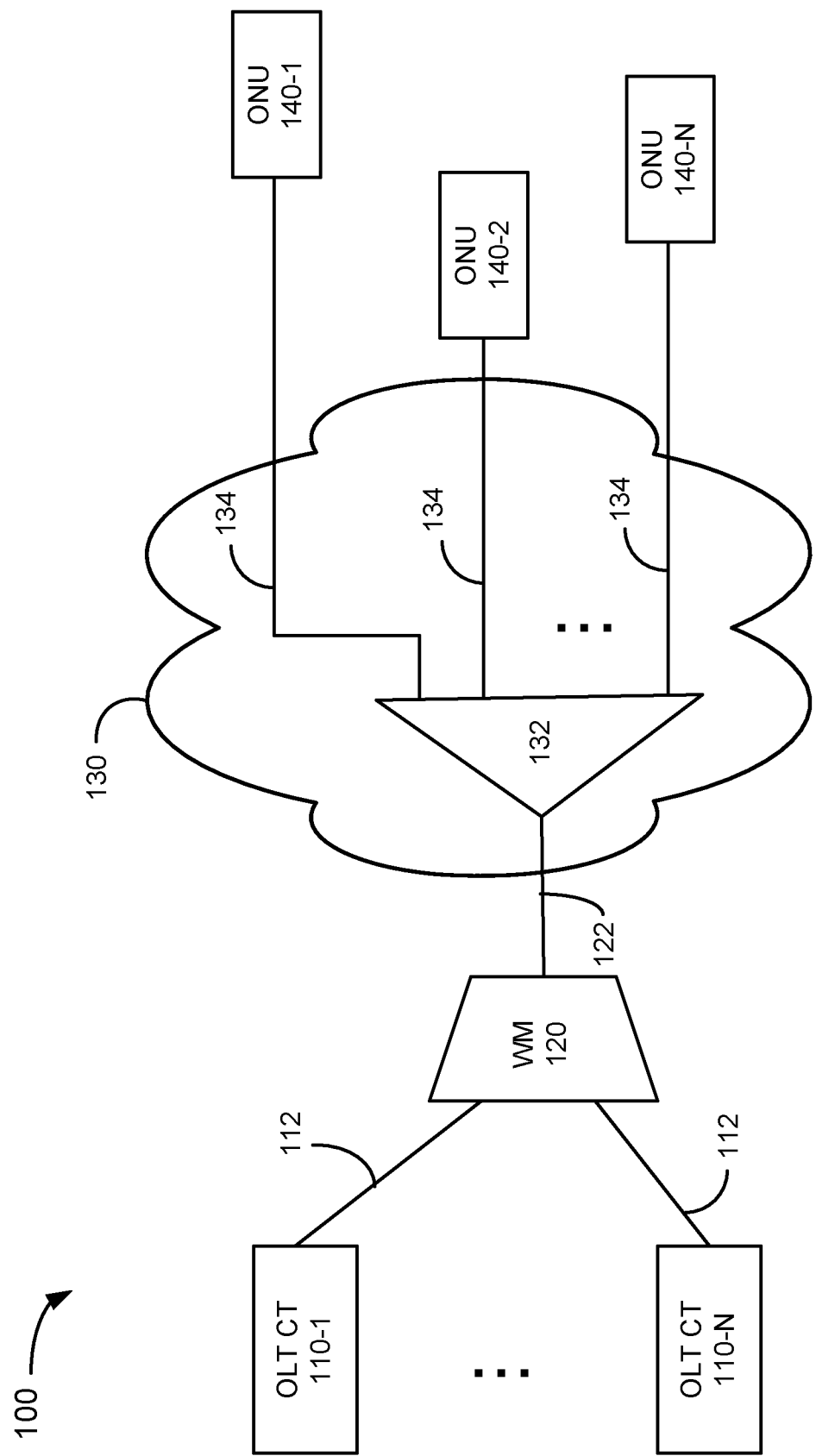
FIG. 1 illustrates an exemplary multi-channel PON system in which systems and methods described herein may be implemented.

FIG. 1 illustrates an exemplary PON environment 100 in which systems and methods described herein may be implemented. PON environment 100 includes a multi-channel time wavelength division multiplexing (TWDM) system that includes a number of optical line terminal channel termination (OLT CT) devices 110-1 through 110-N, wavelength multiplexer (WM) 120, optical distribution network (ODN) 130 and optical network units (ONUs) 140-1 through 140-N (referred to individually as ONU 140 or ONU 140-x, and collectively as ONUs 140, and also referred to as optical user nodes 140).

OLT CT devices 110 (referred to individually as OLT CT 110 or OLT CT 110-x, and collectively as OLT CTs 110) each include an optical device that may perform various functions, such as ONU activation, traffic scheduling, buffer control, and bandwidth allocation. In an exemplary implementation, each OLT CT 110 is associated with its own bi-directional wavelength channel having a fixed downstream wavelength and a fixed upstream wavelength. OLTs 110 may be connected to WM 120 via channel attachment fibers 112. In an exemplary implementation, OLT CT 110 controls upstream transmissions from ONUs 140 via a Bandwidth Map (BWmap). For example, OLT CT 110 may generate the BWmap based on a number of inputs and transmit the BWmap via WM 120 and PON 130 to ONUs 140. OLT CT 110 may also provide feedback to ONUs 140 during ONU activation, as described in detail below.

ODN 130 includes an optical network that provides an optical transmission medium between, for example, OLT CTs 110 and ONUs 140. For example, ODN 130 may include trunk fiber 122, optical splitter 132 and optical drop fibers 134. ODN 130 may also include fiber optic connectors, attenuators, modulators and other optical components (not shown). In an exemplary implementation, ODN 130 may include a passive optical distribution network that includes no active components that are used to transmit signals through ODN 130. In other implementations, ODN 140 may include active optical network components, such as optical amplifiers, reach extenders, etc.

ONUs 140 (referred to individually as ONU 140 or ONU 140-x, or collectively as ONUs 140) may each include an optical device that provides network-side line termination. It may also include optical, electric, or wireless devices that provide user-side interfaces. For example, ONU 140 may perform various functions, such as converting an optical signal to an electrical signal and multiplexing and de-multiplexing. ONU 140 may connect to various end devices or user devices (not shown). The end devices may execute applications and provide users with access to various services, such as television service, telephone service, Internet service and/or other types of services.

In accordance with an exemplary implementation, each ONU 140 may choose a single wavelength channel via which to operate and a single OLT CT 110 as a central node with which ONU 140 will communicate and receive instructions. ONU 140 may also switch wavelength channels, as instructed by the respective OLT CT 110. In addition, and in accordance with an exemplary implementation, an optical transmitter at OLT CT 110 operates in a continuous wave (CW) mode and an optical transmitter at ONUs 140 operates in a burst mode (BM).

In accordance with an exemplary implementation, OLT CT 110 and ONUs 140 may operate using, for example, a protocol-supported set splitting associated with multiple ONUs attempting to activate. By providing feedback from OLT CT 110 regarding ONU activations, each ONU 140 may perform a same set of procedures to retransmit data during activation to efficiently allow each ONU 140 to activate in PON environment 100, as described in detail below.

The exemplary configuration illustrated in FIG. 1 is provided for clarity. It should be understood that a typical environment may include more or fewer devices than illustrated in FIG. 1. For example, PON environment 100 may include a large number (e.g., hundreds or more) of ONUs 140, as well as a large number of OLT CTs 110. PON environment 100 (e.g., ODN 130) may include additional splitters and network devices that aid in routing data in environment 100.

Various operations are described below as being performed by particular components in PON environment 100. In other implementations, various operations described as being performed by one device may be performed by another device or multiple other devices, and/or various operations described as being performed by multiple devices may be combined and performed by a single device.

Figure 2:
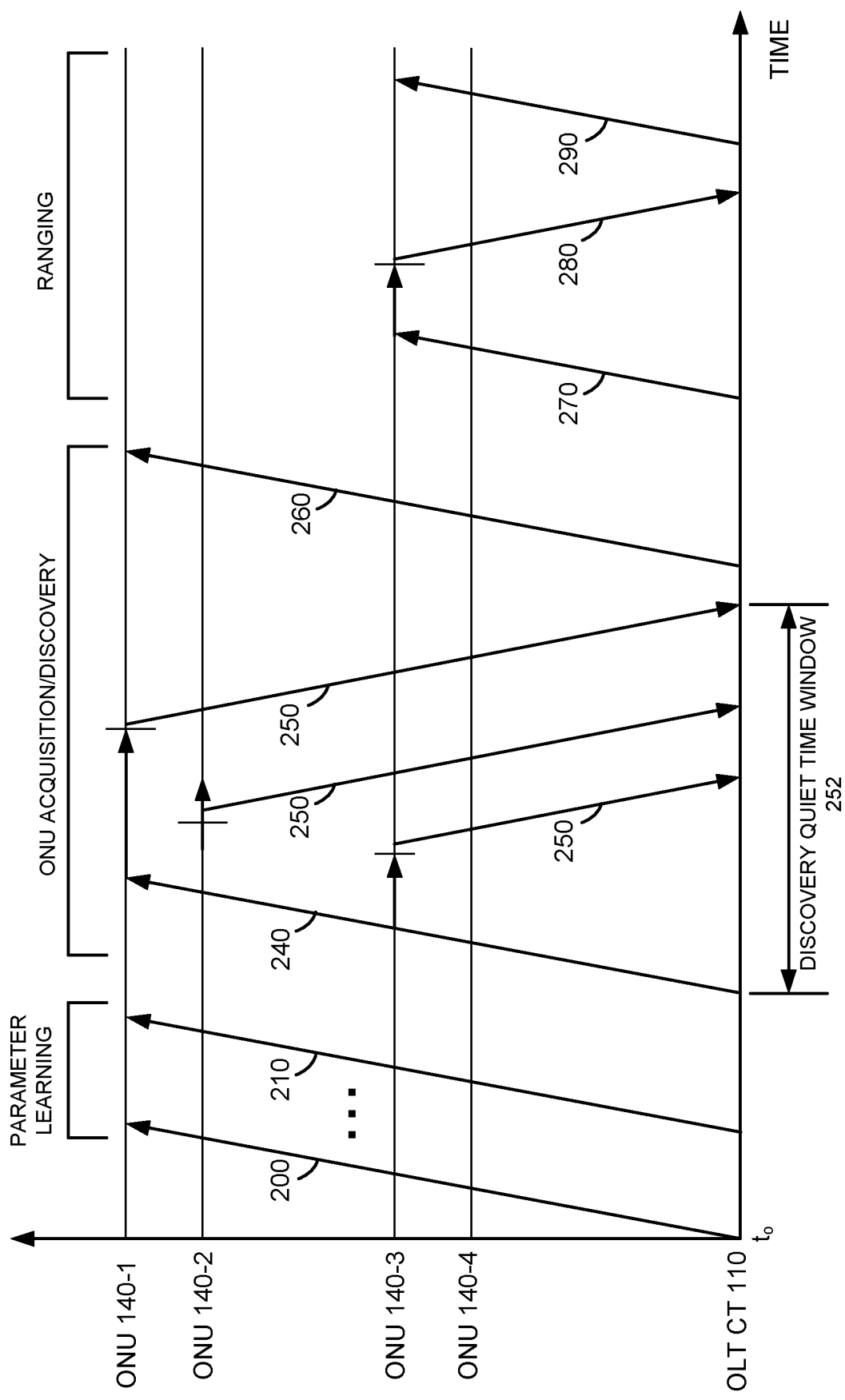
FIG. 2 is a signal/message diagram associated with ONU activation in accordance with an exemplary implementation.

As discussed above, in order for an ONU 140-x to operate or resume operations in PON environment 100, ONU 140-x may execute a set of distributed procedures known as ONU activation. The ONU activation may include several phases, for example, parameter learning, serial number acquisition (also known as ONU discovery), and ranging. FIG. 2 illustrates an exemplary ONU activation process.

To support ONU activation, OLT CT 110 may periodically transmit a series of one or more broadcast OAM messages 200-210, communicating the configuration of PON environment 100 to the attached ONUs 140. Although only two messages 200 and 210 are shown in FIG. 2 for simplicity, it should be understood that OLT CT 110 may broadcast additional OAM messages. Messages 200-210 may be associated with the parameter learning phase of ONU activation and include information identifying the configuration of PON environment 100. For example, broadcast OAM configuration messages 200-210 may include an Upstream Overhead message, a System Profile message, a Channel Profile message, a Burst Profile message, or other similar messages. ONUs 140 receive and process the configuration messages 200-210 to identify parameters associated with operating in environment 100. That is, each ONU 140-x, which is attempting to join or resume operations in PON environment 100 uses downstream broadcast configuration messages 200-210 to learn the configuration of environment 100.

Upon completion of the parameter learning phase, ONU 140-x enters the ONU acquisition, or ONU discovery phase. During the ONU acquisition/discovery phase, ONUs 140 identify an allocation 240 that may be transmitted by OLT CT 110 and that includes an Alloc-ID, which may be pre-assigned to a specific category of ONUs 140, such as activating ONUs 140. In an exemplary implementation, allocation 240 may be in the form of a specific allocation structure of a Bandwidth Map (BWmap) that OLT CT 110 transmits downstream and that controls upstream transmissions from ONUs 140. Alternatively, allocation 240 may be in the form of an OAM message of a bandwidth allocation type.

In each case, ONU 140-x waits for the broadcast, or contention-based allocation 240. In response to allocation 240, ONU 140-x transmits an upstream burst containing OAM message 250 to announce its presence in environment 100. The parameters of the burst transmitted by ONU 140-x may include parameters referenced by allocation 240, as well as parameters obtained from downstream broadcast configuration messages 200-210. In one implementation, upstream OAM messages 250 may be Serial Number ONU message identifying the particular serial number of ONU 140-x.

To avoid collisions between the upstream OAM message 250, which announces activating ONU 140's presence, and upstream transmissions by previously activated ONUs 140, OLT CT 110 creates a discovery quiet window, labeled 252 in FIG. 2, by withholding bandwidth allocations to the already activated ONUs 140 for the entire duration of the time interval when ONUs 140 that undergo activation may transmit their OAM messages 250. The discovery quiet window may be set to be long enough in time to accommodate a response from the ONU 140-x, located closest to OLT CT 110 and having the shortest fiber distance to OLT CT 110-x and the fastest response time, and to accommodate a response from the ONU 140-x located the farthest from OLT CT 110 and having the longest fiber distance from OLT CT 110-x and the slowest response time.

Upon successful receipt of upstream OAM message 250 from ONU 140-x identified by ONU 140-x's serial number, OLT CT 110 may assign a link layer address to ONU 140-x and communicate the assignment via broadcast OAM message 260. In one implementation, the link layer address may be in the form of an ONU-ID and broadcast OAM messages 260 may be, for example, an Assign ONU-ID message. Broadcast OAM message 260 may specify the serial number of the recipient ONU 140-x and the assigned link layer address. The receipt of broadcast OAM message 260 by ONU 140-x whose serial number may be specified in OAM message 260 corresponds to the completion of the ONU serial number acquisition phase of the ONU 140-x activation.

Upon completion of the ONU acquisition/discovery phase, a ranging phase may commence. In the ranging phase, OLT CT 110 transmits a directed allocation 270 to ONT 140-x and prepares to measure the response time. In response to directed allocation 270, ONU 140-x transmits an upstream burst containing OAM message 280. OAM message 280 may be, for example, a Serial Number ONU message, Registration message, or some other message. Based on the measured response time and/or a difference between the measured response time and the expected ideal response time, OLT 110 computes the equalization delay of ONU 140-x and communicates the computed equalization delay to ONU 140-x using unicast OAM message 290 addressed specifically to ONU 140-x. Unicast OAM message 290 may be, for example, a Ranging Time message. ONU 140-x acknowledges receipt of unicast OAM message 290. The receipt of unicast OAM message 290 completes the ranging phase of ONU 140-x activation. At this point, ONU 140-x is considered activated. In accordance with an exemplary implementation, during the ONU activation process, OLT CT 110 may also provide feedback to ONUs 140 that are attempting to activate. This feedback may be used by ONUs 140 to perform specific procedures associated with when to attempt retransmissions in the event of collisions, as described in detail below.

Figure 3:
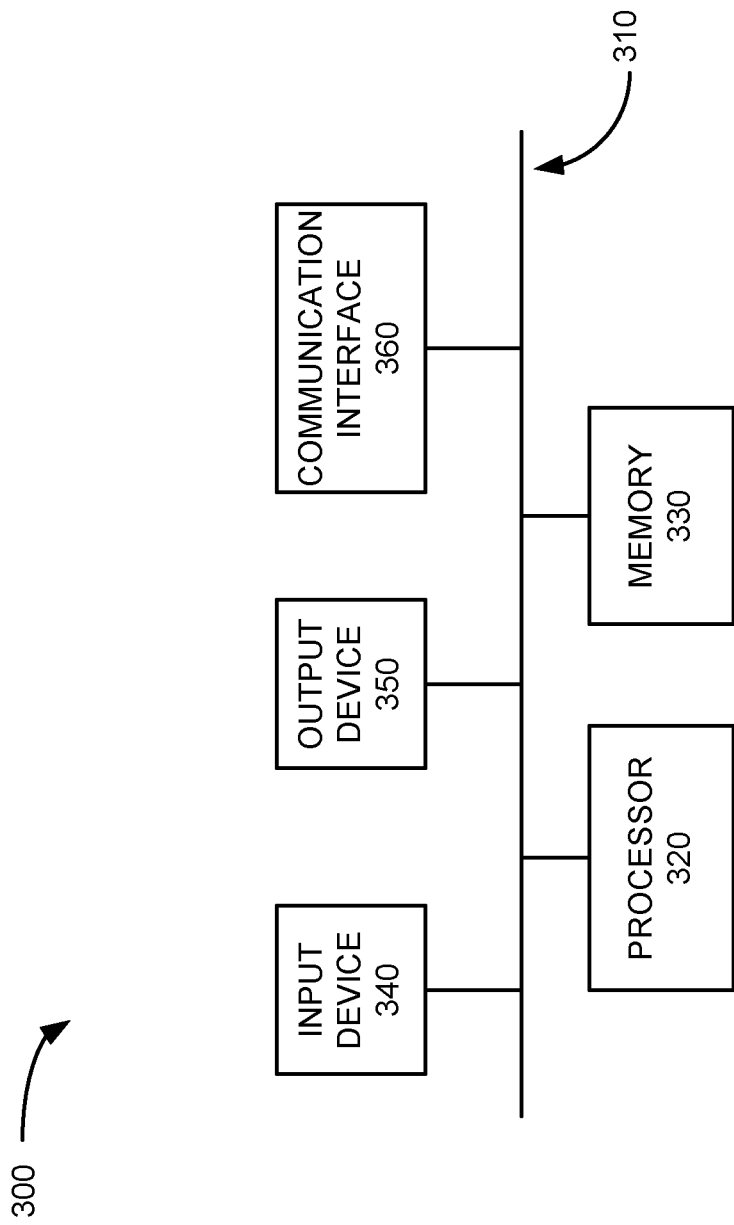
FIG. 3 is a block diagram of components implemented in one or more of the elements of FIG. 1 in accordance with an exemplary implementation.

FIG. 3 illustrates an exemplary configuration of a device 300. Device 300 may correspond to or include elements implemented in components of PON environment 100, such as OLT CTs 110, a component of OLT CT 110 (e.g., an ONU activation module/logic, a bandwidth map generation module/logic, etc.), ONUs 140, a component of ONU 140 (e.g., an activation module/logic), etc. Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that device 300 uses to communicate with other devices via wired, wireless or optical mechanisms. For example, communication interface 360 may include one or more optical or radio frequency (RF) transmitters, receivers and/or transceivers and one or more components and/or antennas for transmitting and receiving optical data, RF data, etc. Communication interface 360 may also include a modem or an Ethernet interface to a LAN or other mechanisms for communicating with elements in a network.

The exemplary configuration illustrated in FIG. 3 is provided for simplicity. It should be understood that device 300 may include more or fewer devices than illustrated in FIG. 3. In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
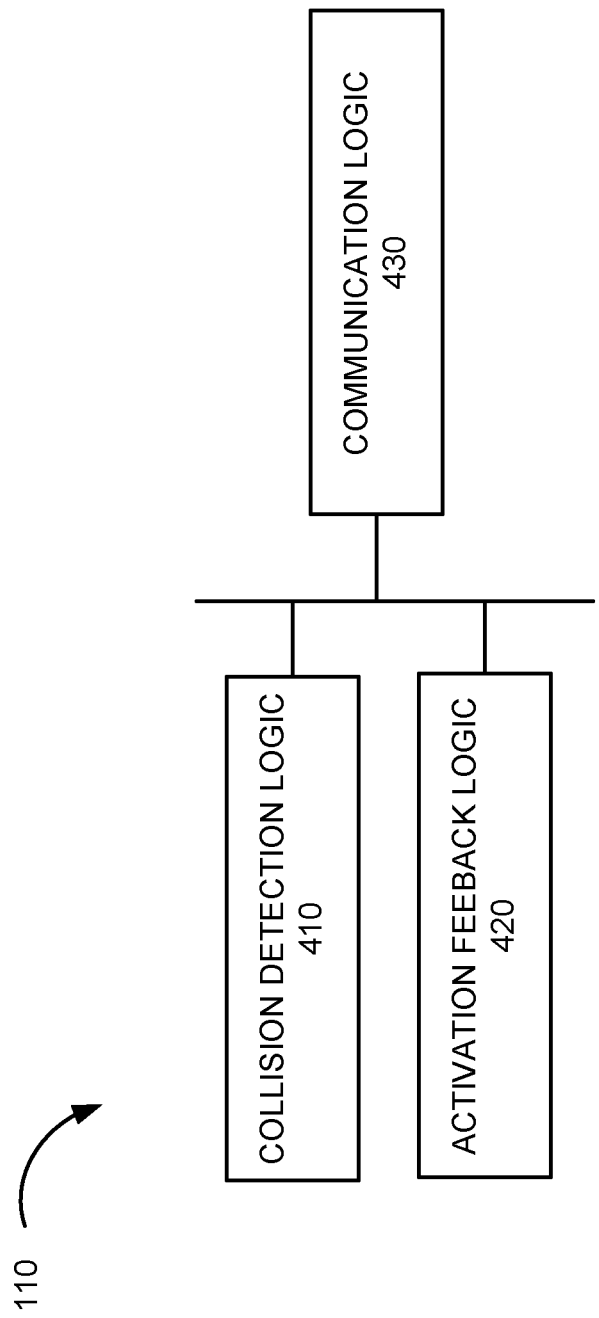
FIG. 4 is a block diagram of elements implemented in the optical line terminal channel termination device of FIG. 1 in accordance with an exemplary implementation.

FIG. 4 is a block diagram of components implemented in OLT CT 110 in accordance with an exemplary implementation. Referring to FIG. 4, OLT CT 110 includes collision detection logic 410, activation feedback logic 420 and communication logic 430. These elements may be implemented by processor 320 executing instructions stored in memory 330 of OLT CT 110. In alternative implementations, these components or a portion of these components may be located externally with respect to OLT CT 110.

Collision detection logic 410 may include logic to determine that a collision has occurred with respect to data transmission from ONUs 140 intended for OLT CT 110. For example, as described previously, multiple ONUs 140 may transmit burst messages 250 that are received by OLT CT 110 at the same time or overlapping time periods. In such cases, OLT CT 110 is unable to decode the transmission (e.g., transmissions 250) and collision detection logic 410 may determine that a collision has occurred.

Activation feedback logic 420 may include logic to provide feedback to ONUs 140 attempting to activate in environment 100. For example, activation feedback logic 420 may generate a message to indicate whether no upstream transmission has been received after an allocation 240 has been transmitted, whether a collision has occurred, whether an OAM message 250 has been successfully received and decoded, etc. In accordance with an exemplary implementation, activation feedback from OLT CT 110 to the subtending ONUs 140 in PON environment 100 may be conveyed from OLT CT 110 via a broadcast OAM message. The broadcast OAM message carrying the activation feedback may be a modified link layer address assignment message 260, for example, an Assign ONU-ID message, or another OAM message that is configured to include feedback information. OLT CT 110 may also send the broadcast OAM message with the activation feedback for each bandwidth allocation 240 that is transmitted and before OLT CT 110 issues a subsequent bandwidth allocation 240 to the same Alloc-ID.

Figure 5:
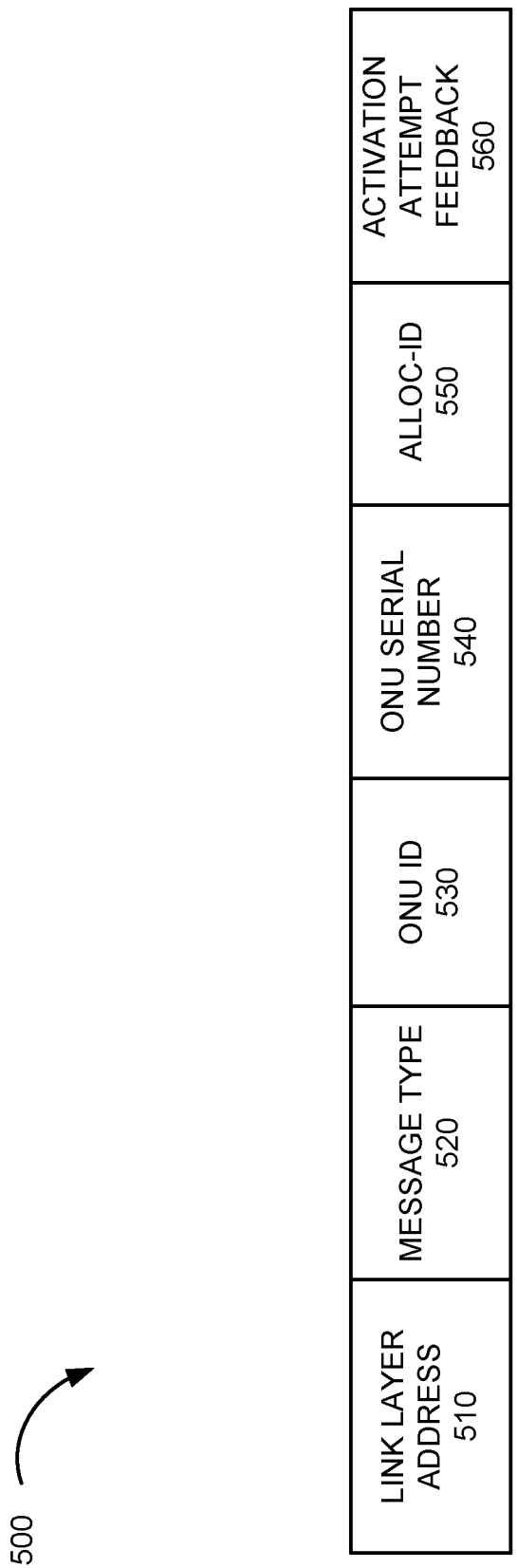
FIG. 5 illustrates the format of a message used to provide activation-related feedback to components of the PON system in accordance with an exemplary implementation.

FIG. 5 illustrates an exemplary activation feedback message 500 generated and transmitted by OLT CT 110. Referring to FIG. 5, activation feedback message 500 may include link layer address field 510, message type field 520, ONU ID field 530, ONU Serial Number field 540, Alloc ID field 550 and Activation Attempt Feedback field 560. It should be understood that these fields are exemplary and activation feedback message 500 may include different and/or other fields.

Link layer address field 510 indicates which ONU 140-x is the intended recipient of message 500. In one implementation, link layer address field 510 may be set to "broadcast" indicating that message 500 is to be received by all ONUs 140 in the PON environment 100. Message type field 520 indicates the type of the downstream OAM message, such as "Activation Feedback." Alternatively, message type field 520 may indicate "Assign ONU-ID." ONU ID field 530 contains the value of ONU-ID being assigned as a result of a successful upstream OAM message transmission 250. In one implementation, a special code point of ONU-ID field denotes a NULL value, which is used when no successful ONU-ID assignment is indicated. For example, the code point 1023 may denote the NULL value. ONU Serial Number field 540 indicates the specific ONU 140-x to which the successful ONU-ID assignment is made. By comparing the content of ONU Serial Number field 540 with its own Serial Number, ONU 140-x can determine whether the successful assignment is made to this ONU or another ONU. A special code point of ONU Serial Number field 540 may denote the NULL value, which may be used when no successful ONU-ID assignment is indicated. For example, all zeros in ONU Serial Number field 540 may denote the NULL value. Alloc-ID field 550 provides an indication which of potentially several bandwidth allocations 240, each pertaining to a specific Alloc-ID, the present activation feedback message 500 relates to. Activation attempt feedback field 560 may include the discovery quiet window outcome observed by OLT 110, such as whether a successful OAM message 250 has been received in response to allocation 240, whether a collision has occurred, etc., as described in detail below. For example, particular values or code points of the Activation attempt feedback field 560 may correspond to "No upstream transmission received", "Successful ONU-ID assignment with interference not assessed", "Successful ONU-ID assignment with no interference", "Successful ONU-ID assignment with one or more interferers", "Failure to assign ONU-ID due to collision", etc. In each case, Activation Attempt Feedback field 560 conveys to all ONUs 140 the status associated with each allocation 240.

It should be understood that the message format of the broadcast activation feedback OAM message 500 illustrated in FIG. 5 is exemplary. For example, in other implementation, the number of fields, size of the fields, order of the fields may vary. In addition, some fields may be partitioned in multiple sections or sub-fields. For example, ONU Serial Number field 540 may include two sections with the first section indicating a universal Vendor ID and a second section indicating the Vendor-specific serial number.

Referring back to FIG. 4, communication logic 430 may include logic for communicating with devices in environment 100. For example, communication logic 430 may include an optical transceiver that transmits and receives optical information to/from PON 130. Communication logic 430 may communicate with WM 120, ONUs 140 and other devices in environment 100. In an exemplary implementation, communication logic 430 may transmit messages 500 generated by activation feedback logic 420.

Although FIG. 4 shows exemplary components of OLT CT 110, in other implementations, OLT CT 110 may include fewer components, different components, differently arranged components, or additional components than depicted in FIG. 4.

Figure 6:
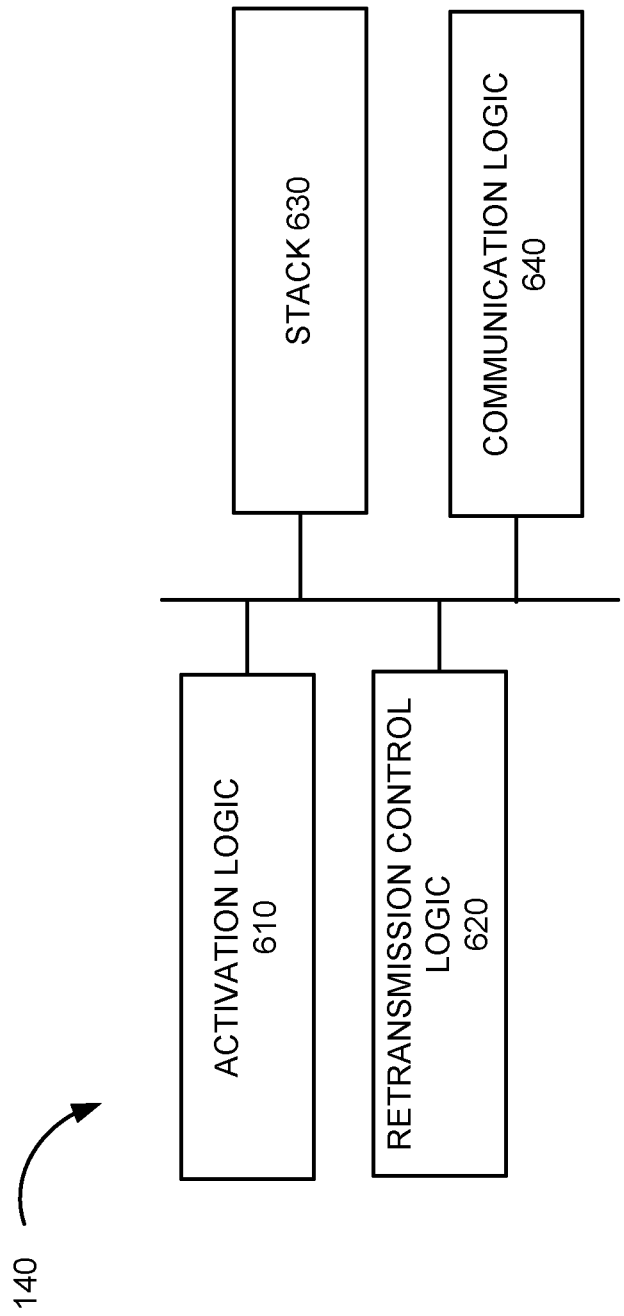
FIG. 6 is a block diagram of components implemented in the ONUs of FIG. 1 in accordance with an exemplary implementation.

FIG. 6 is a block diagram of components implemented in ONUs 140 in accordance with an exemplary implementation. Referring to FIG. 6, ONU 140-x includes activation logic 610, retransmission control logic 620, stack 630 and communication logic 640. These elements may be implemented by processor 320 executing instructions stored in memory 330 of ONU 140-x. In alternative implementations, these components or a portion of these components may be located externally with respect to ONU 140-x.

Activation logic 610 may include logic associated with an activation process in environment 100. For example, activation logic 610 may receive and process messages 200-210 during the parameter learning phase, receive an allocation 240 and provide an OAM message 250 during ONU acquisition/discovery, and provide a response to allocation 270 during the ranging phase.

Retransmission control logic 620 may include logic to receive feedback messages from OLT CT 110 regarding attempted ONU activations, such as messages 500. Retransmission control logic 620 may then execute a set of procedures or protocol to determine when to attempt a retransmission of, for example, OAM message 250. In one implementation, retransmission control logic 620 may use a virtual stack structure to aid in determining when to attempt a retransmission of OAM message 250

Figure 7:
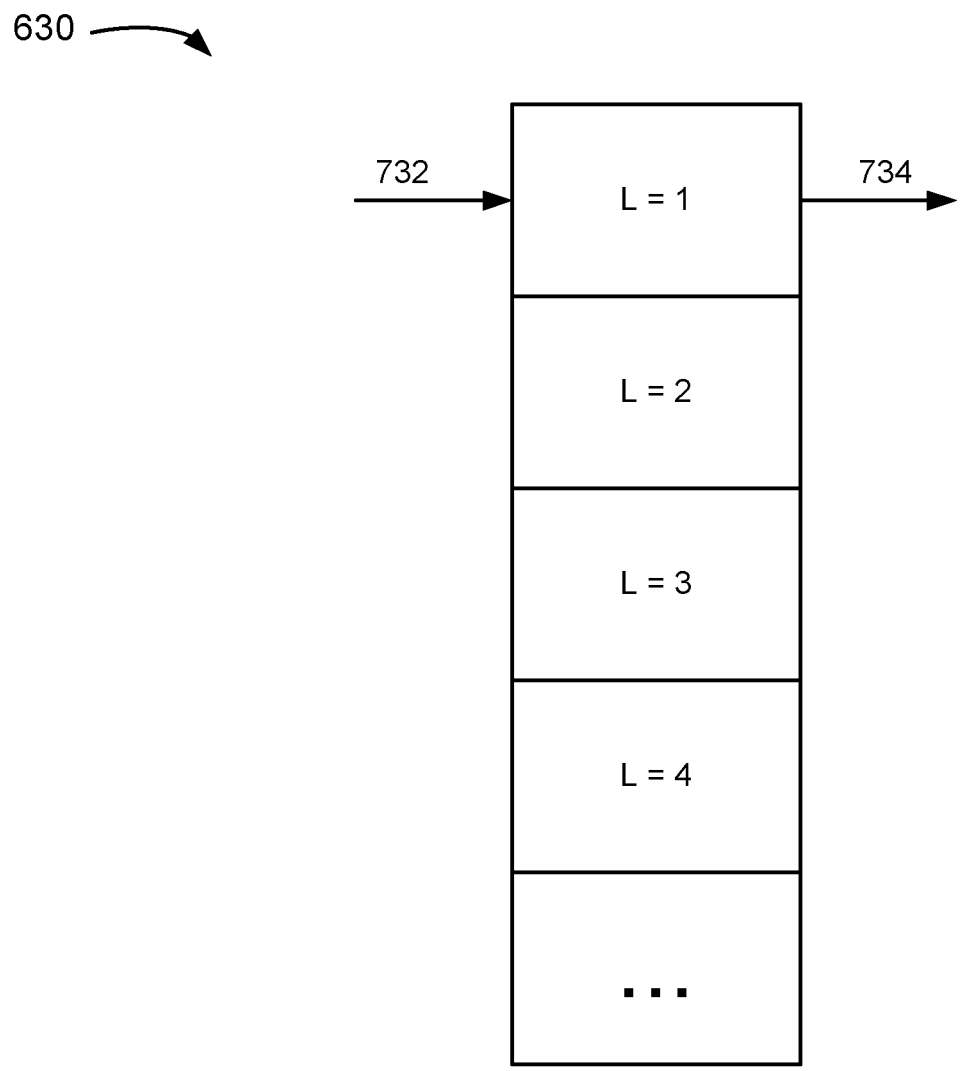
FIG. 7 illustrates a virtual stack used by ONUs of FIG. 1 in accordance with an exemplary implementation.

Stack 630 may include a virtual data structure, value or pointer (referred to herein as virtual stack or stack 630) stored in, for example, memory 330. In an exemplary implementation, stack 630 may be a pointer or value associated with a protocol used by ONUs 140 in connection with retransmission control logic 620 to allow retransmission control logic 620 to determine when to retransmit, for example, an OAM message 250. For example, FIG. 7 schematically illustrates stack 630 according to an exemplary implementation. Referring to FIG. 7, stack 630 includes a number of layers or possible values denoted by the letter L. Stack 630 may be used in connection with protocol-supported set splitting to mitigate collisions in environment 100.

In an exemplary implementation, each ONU 140 stores its own virtual stack 630. As discussed above, in one implementation, stack 630 may be a value or pointer used with respect to determining an operation or function to perform with respect to a current layer of stack 630 (e.g., PUSH, POP, STAY or SPLIT functions) described below. When ONU activation begins, each ONU 140-*x* may set stack 630 or a stack value/pointer to layer 1 (L=1; the state of ONU 140 corresponds to the top of stack 630). An ONU 140-*x* may transmit its respective OAM message 250 in response to an allocation 240 when L is equal to 1. In response to feedback from OLT CT 110 (e.g., from activation feedback logic 420), retransmission control logic 620 may change the current layer of stack 630. For example, retransmission control logic 620 may "push" (e.g., L=L+1) the current layer of stack 630 to a lower layer, such as from layer 1 to layer 2, "pop" (e.g., L=L−1) the current layer to a higher layer, such as from layer 3 to layer 2, etc.) or execute a "stay" which keeps the layer of stack 630 at its current layer. All ONUs 140 may execute the same procedures with respect to modifying the layer of each ONU 140's particular stack 630, as described in detail below. For example, a set of ONUs 140 belonging to any stack layer L resolve their collision prior to any ONU 140 which is at a lower layer of its stack 630 (i.e., having a higher value of L). In an exemplary implementation, each ONU 140-*x* maintains an instance of virtual multilayer stack 630, and controls the layer of the stack to which it belongs via feedback (e.g., messages 500) from OLT CT 110 and a set of rules, described below. In this manner, each ONU 140-*x* is guaranteed to activate regardless of the number of ONUs 140 in environment 100.

Referring back to FIG. 6, communication logic 640 may include logic for communicating with devices in environment 100. For example, communication logic 640 may include an optical transceiver that transmits and receives optical information to/from PON 130. Communication logic 640 may communicate with OLT CT 110 and other devices in environment 100. In an exemplary implementation, communication logic 640 may transmit messages generated by activation logic 610, as described in detail below.

Although FIG. 6 shows exemplary components of ONU 140-*x*, in other implementations, ONT 140-*x* may include fewer components, different components, differently arranged components, or additional components than depicted in FIG. 6.

Figure 8:
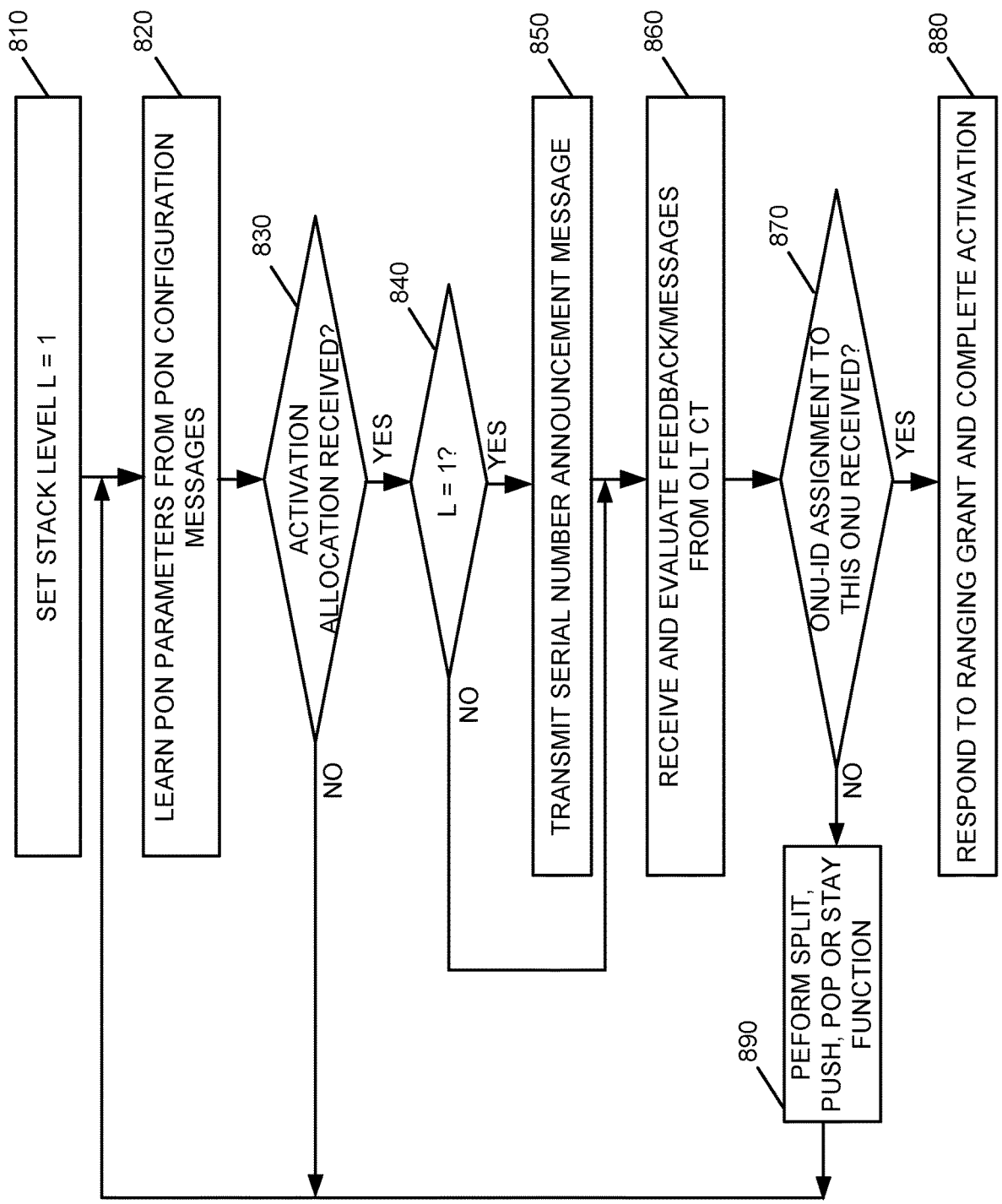
FIG. 8 is a flow diagram associated with ONU activation in accordance with an exemplary implementation.

FIG. 8 is an exemplary flow diagram illustrating processing associated with resolving collisions in environment 100. The procedure of FIG. 8 may be executed each time an ONU 140-*x* is performing activation in PON environment 100, such as when ONU 140-*x* is reinitialized due to a power cycle, a command received from OLT CT 110, an internal condition, a reboot of OLT CT 110, or some other reason. Assume that ONU 140-*x* is ready to attempt an activation in environment 100. In such a situation, ONU 140-*x* sets the layer of stack 630 to layer 1 (stack entry 732) (block 810).

As discussed above with respect to FIG. 2, ONU 140-*x* may receive OAM messages 200-210 during the parameter learning phase of ONU activation and learn parameters associated with PON environment 100 (block 820). After the parameter learning phase, ONU 140-*x* may determine if a broadcast contention-based allocation 240 from OLT CT 110 is received (block 830). As discussed above, allocation 240 may include an Alloc-ID. If an activation allocation 240 is not received (block 830—no), ONU 140-*x*, processing may return to block 820. If, however, an activation allocation is received (block 830—yes), ONU 140-*x* determines if the layer of stack 630 is equal to 1 (i.e., whether L equals 1) (block 840). If the layer of stack 630 is equal to 1 (block 840—yes), ONU 140-*x* transmits an OAM message 250 (block 850). As discussed above, in some implementations, OAM message 250 may be a Serial Number Announcement message that includes the serial number of ONU 140-*x*. In some implementations, prior to transmitting OAM message 250, ONU 140-*x* may apply randomization by delaying the transmission of OAM message 250 by a pseudorandom time interval.

After transmitting OAM message 250, ONU 140-*x* receives and processes feedback/messages from OLT CT 110 (block 860). For example, if ONU 140-*x* receives a link layer address assignment specifically directed to ONU 140-*x* (e.g., includes the serial number of ONU 140-*x*) (block 870—yes), ONU 140-*x* completes activation as described with respect to FIG. 2 (e.g., executes ranging), exits stack (734 in FIG. 7) and completes execution of the activation procedure (block 880). For example, ONU 140-*x* responds to a directed allocation 270 (e.g., a ranging grant) via OAM message 280 and completes activation. If the activation feedback from OLT CT 110 indicates an event other than a link layer address assignment directed to ONU 140-*x*, ONU 140-*x* performs operations on virtual stack 630, such as a SPLIT, PUSH, POP or STAY function (block 890), as described in detail below.

For example, assume that after transmitting OAM message 250, ONU 140-*x* observes a successful link layer address assignment 260 to another ONU 140. In this case, ONU 140-*x* remains at the same stack layer. For example, retransmission control logic 620 at ONU 140-*x* may execute a STAY function, resulting in no operation with respect to stack 630. That is, the STAY function keeps the instance of stack 630 at its current layer.

However, if upon transmitting OAM message 250, ONU 140-*x* observes an indication of a collision with no successful link layer address assignment 260 directed to ONU 140-*x* (e.g., with the serial number of ONU 140-*x*) within a predetermined period of time and receives message 500 with activation attempt feedback field 560 indicating that a collision occurred, ONU-140-*x* may execute a SPLIT function. For example, retransmission control logic 620 may perform a random operation (e.g., having a 50% probability of either outcome) to maintain stack 630 at its current layer, or push the current layer of stack 630 one layer lower than its current position (e.g., from layer 1 to layer 2, from layer 2 to layer 3, etc.).

In an exemplary implementation, if ONU 140-x has been below the top level of stack 530 (L>1), ONU 140-x may act upon the activation attempt feedback provided by OLT CT 110-x as follows: 1) If ONU 140-x with L>1 observes a successful link layer address assignment 260 to another ONU 140-x either with no interference from additional contending ONUs 140 or with OLT CT 110-x being unable to report such interference, ONU 140-x executes a POP function in which L is reset to L−1. For example, retransmission control logic 620 raises the layer of stack 630 by one layer (e.g., from layer 2 to layer 1); 2) If ONU 140-x with L>1 observes a successful link layer address assignment 260 to another ONU 140-x with an indication of interference from additional contending ONUs 140, retransmission control logic 620 may execute STAY function, which results in keeping stack 630 at its current layer; 3) If ONU 140-x with L>1 observes an indication of a collision with no successful link layer address assignment, retransmission control logic 620 at ONU 140-x executes a PUSH function in which L is set to L+1 to lower the layer of stack 630 by one layer (e.g., from layer 1 to layer 2).

Figure 9:
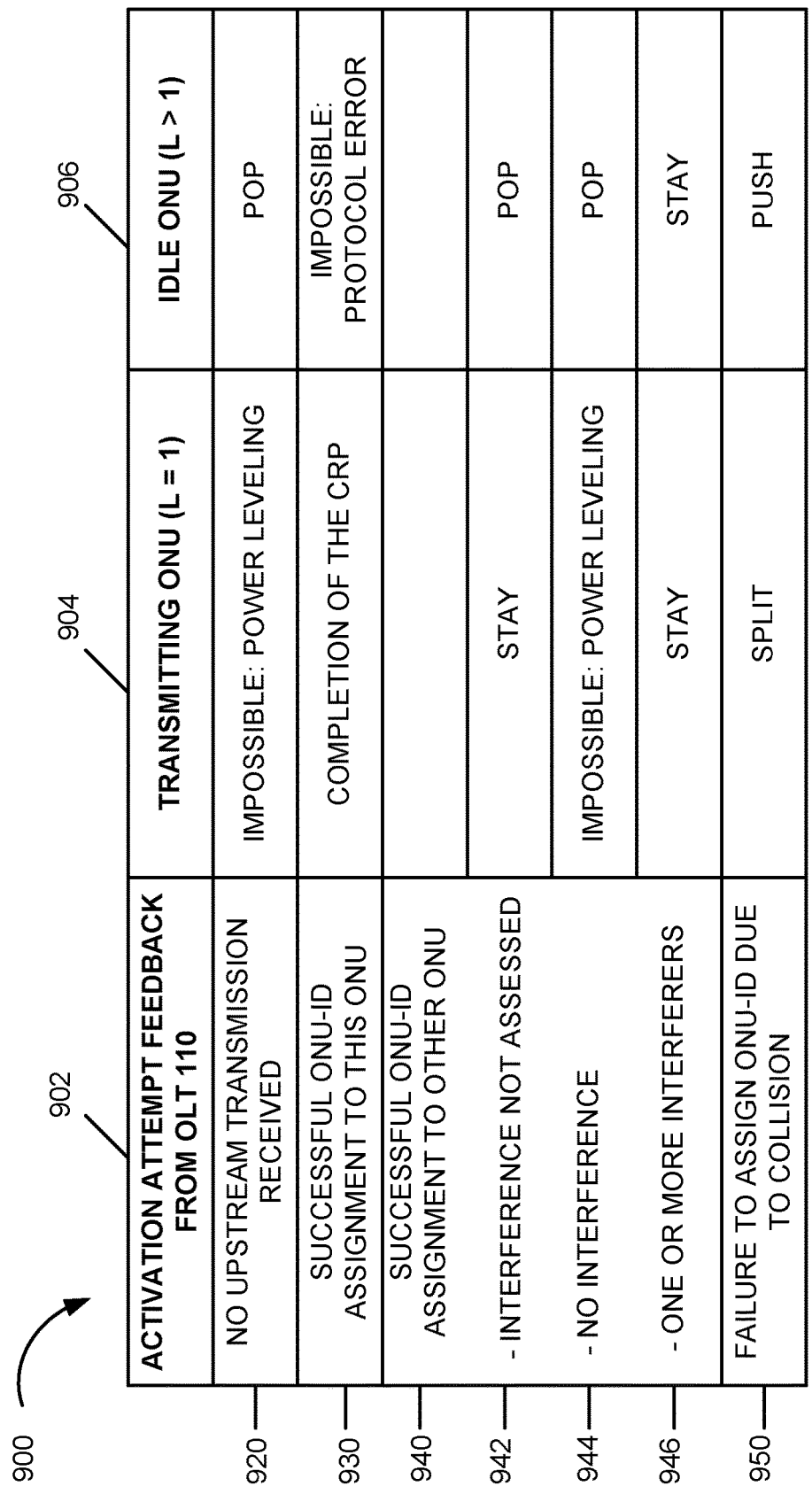
FIG. 9 illustrates exemplary feedback and processing by ONUs in response to the feedback in the system of FIG. 1.

FIG. 9 illustrates an exemplary transition table 900 that identifies several particular cases associated with activation feedback from OLT CT 110 and corresponding actions performed by ONU 140-x. Referring to FIG. 9, table 900 includes column 902 associated with various activation attempt feedbacks, column 904 associated with a transmitting ONU 140 in which L is equal to 1; and column 906 in which an idle ONU 140 in which L is greater than 1.

Entry 920 indicates that ONT 140-x received feedback indicating that OLT CT 110 received no upstream transmission after transmitting allocation 140. In this case, such inconsistent activation feedback observed by ONU 140-x after transmitting OAM message 250 may indicate that an optical power level of the ONU 140's transmitter is too low. In such a case, a transmitting ONU 140-x at layer 1 may initiate an autonomous power levelling procedure to adjust its optical power, as illustrated in column 904 for entry 920, while executing STAY function for the purpose of collision resolution. For an idle ONU 140-x in which no upstream transmission is received, retransmission control logic 620 performs a POP function to raise the layer of stack 630 (e.g., from L=2 to L=1).

For entry 930, if ONU 140-x with L=1 receives feedback indicating a successful ONU ID assignment, ONU 140-x, this may complete the collision resolution protocol (CRP) for ONU 140-x. However, if an ONU 140-x in which L>1 receives feedback indicating a successful link layer address assignment to ONU 140-x, which is not possible since ONU 140-x is not able to transmit OAM message 500 when L is greater than 1, ONU 140-x may take different steps depending on a particular embodiment. For example, ONU 140-x may consider the link layer address assignment as valid, and execute stack exit 734 and reset the instance of virtual stack 630, and complete activation.

For entry 940 in which a successful ONU ID assignment to another ONU 140 is observed by ONU 140-x and the activation feedback from OLT CT 110 indicates that interference has not been assessed (row 942), a transmitting ONU with L=1 executes the STAY function and an idle ONU 140-x with L>1 executes a POP function.

For entry 940 in which a successful ONU ID assignment to another ONU 140 is observed by ONU 140-x and the activation feedback from OLT CT 110 indicates that no interference has occurred (row 944), such a condition is not possible and ONU 140-x may perform power leveling. For an idle ONU 140-x with L>1, retransmission control logic 620 executes a POP function.

For entry 940 in which a successful ONU ID assignment to another ONU 140 is observed by ONU 140-x and the activation feedback from OLT CT 110 indicates that in addition to the successful ONU ID assignment to another ONU 140, one or more ONUs 140 caused interference, ONU 140-x may execute a STAY function and an idle ONU 140-x with L>1 may also execute a STAY function.

For entry 950 in which ONU 140-x receives feedback from OLT CT 110 indicating that no assign message 260 has been sent due to collisions at OLT CT 110, transmitting ONU 140-x may execute a SPLIT function and an idle ONU 140-x may execute a PUSH function.

Referring back to FIG. 8, after retransmission control logic 620 at ONU 140-x (and all other ONUs 140) performs SPLIT, PUSH, POP or STAY functions as described above (block 890), processing may return to block 820. Processing may continue in this manner until each ONU 140-x receives an assignment 260.

Figure 10:
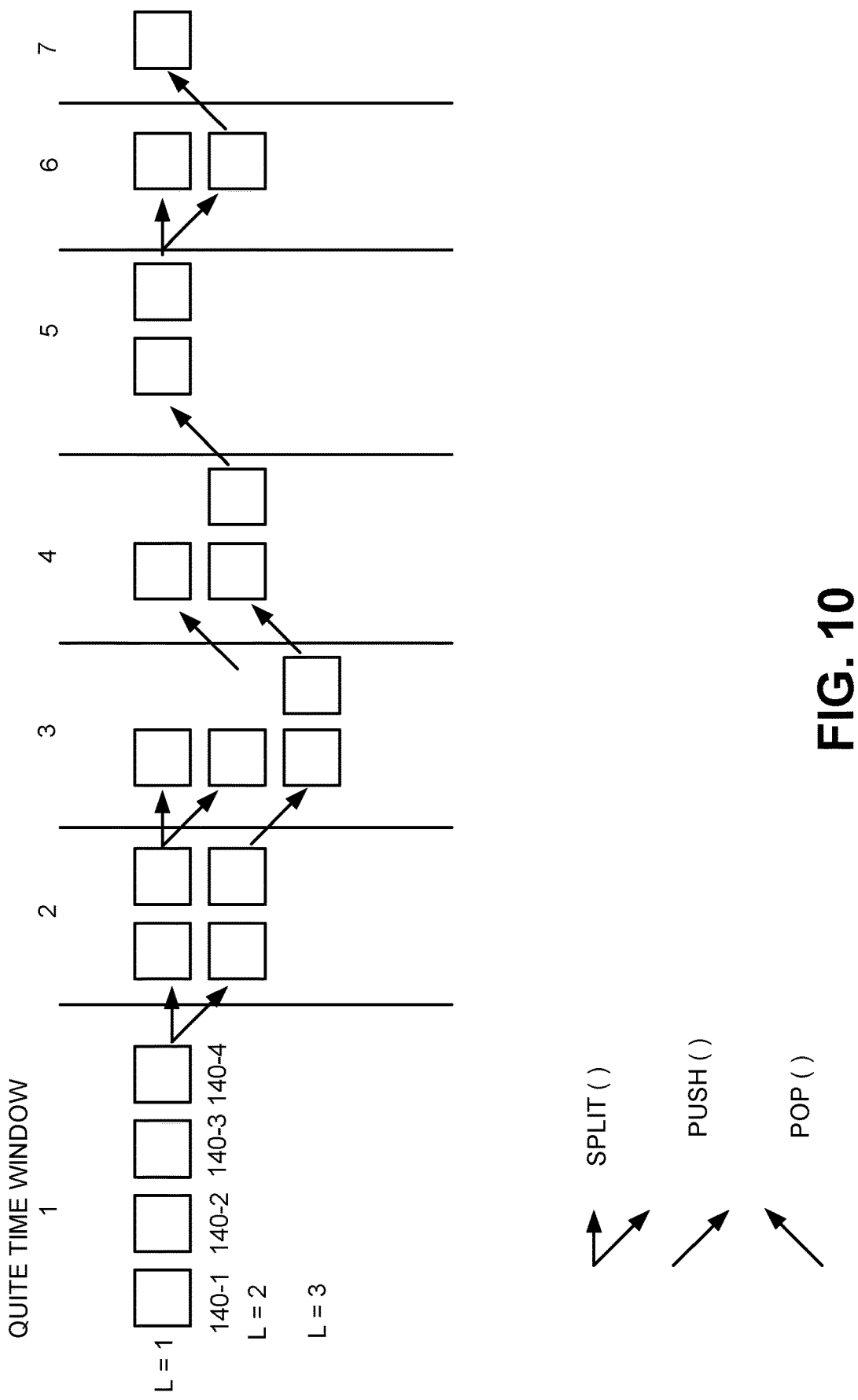
FIG. 10 schematically illustrates retransmission processing by ONUs of a PON system in accordance with an exemplary implementation.

FIG. 10 schematically illustrates four ONUs 140-1 through 140-4 at Layer 1 of their respective stacks 630 at the start of ONU activation. As illustrated in quiet time window 1, assume that each of the four ONUs 140 attempts to respond to an allocation 240 via messages 250. Further assume that OLT CT 110 detects a collision. In this case, OLT CT 110 transmits message 500 indicating that a collision occurred. Each ONU 140 receives the collision indication and performs a SPLIT function. Based on the SPLIT function having an equal probability of resulting in a STAY or a PUSH, two ONUs 140 will stay at layer 1 and two ONUs 140 will execute the PUSH function and move to layer 2, as illustrated in quiet time window 2. Each of the ONUs 140 at layer 1 may then transmit message 250 in response to an allocation 240.

In this case, OLT CT 110 detects a collision and transmits message 500 indicating that a collision occurred. Each ONU 140 receives the collision indication message 500 and the two ONUs at layer 1 perform a SPLIT function and the two ONUs at layer 2 perform a PUSH function, resulting in one ONU 140 at layer 1, one ONU at layer 2 and two ONUs 140 at layer 3. The ONU at layer 1 may then execute a transmission in response to allocation 240 during quiet time window 3. Since only one ONU 140 transmitted data, OLT CT 110 may successfully receive and decode the transmission. OLT CT 110 may transmit a message 500 indicating a successfully receipt of message 250. In response, the ONU 140 at layer 2 executes a POP function and the two ONUs at layer 3 also execute a POP function, resulting in one ONU 140 at layer 1 and two ONUs 140 at layer 2 in quiet time window 4.

The ONU at layer 1 may then execute a transmission in response to allocation 240. Since only one ONU 140 transmitted data, OLT CT 110 may successfully receive and decode the transmission. OLT CT 110 may transmit a message 500 indicating a successfully receipt of message 250. In response, the two ONUs 140 at layer 2 execute a POP function, resulting in two ONUs 140 at layer 1 in quiet time window 5.

The two ONUs at layer 1 may then transmit messages 250 in response to an allocation 240. In this case, OLT CT 110 detects a collision and transmits message 500 indicating that a collision occurred. Each ONU 140 receives the collision indication and the two ONUs at layer 1 perform the SPLIT function, resulting in one ONU 140 at layer 1, one ONU at layer 2 during quiet time window 6. The ONU at layer 1 may then execute a transmission 250 in response to allocation 240. Since only one ONU 140 transmitted data, OLT CT 110 may successfully receive and decode the transmission. OLT CT 110 may transmit a message 500 indicating a successfully receipt of message 250. In response, the ONU 140 at layer 2 executes the POP function resulting in one ONU 140 at layer 1 during quiet time window 7. The remaining ONU 140 at layer 1 may then receive an allocation 240 and provide a response 250, which will be successfully received. In this manner, ONUs 140 perform a same procedure with respect to retransmission control based on feedback information provided by OLT CT 110 regarding the success/failure of previous activation attempts.

Figure 11:
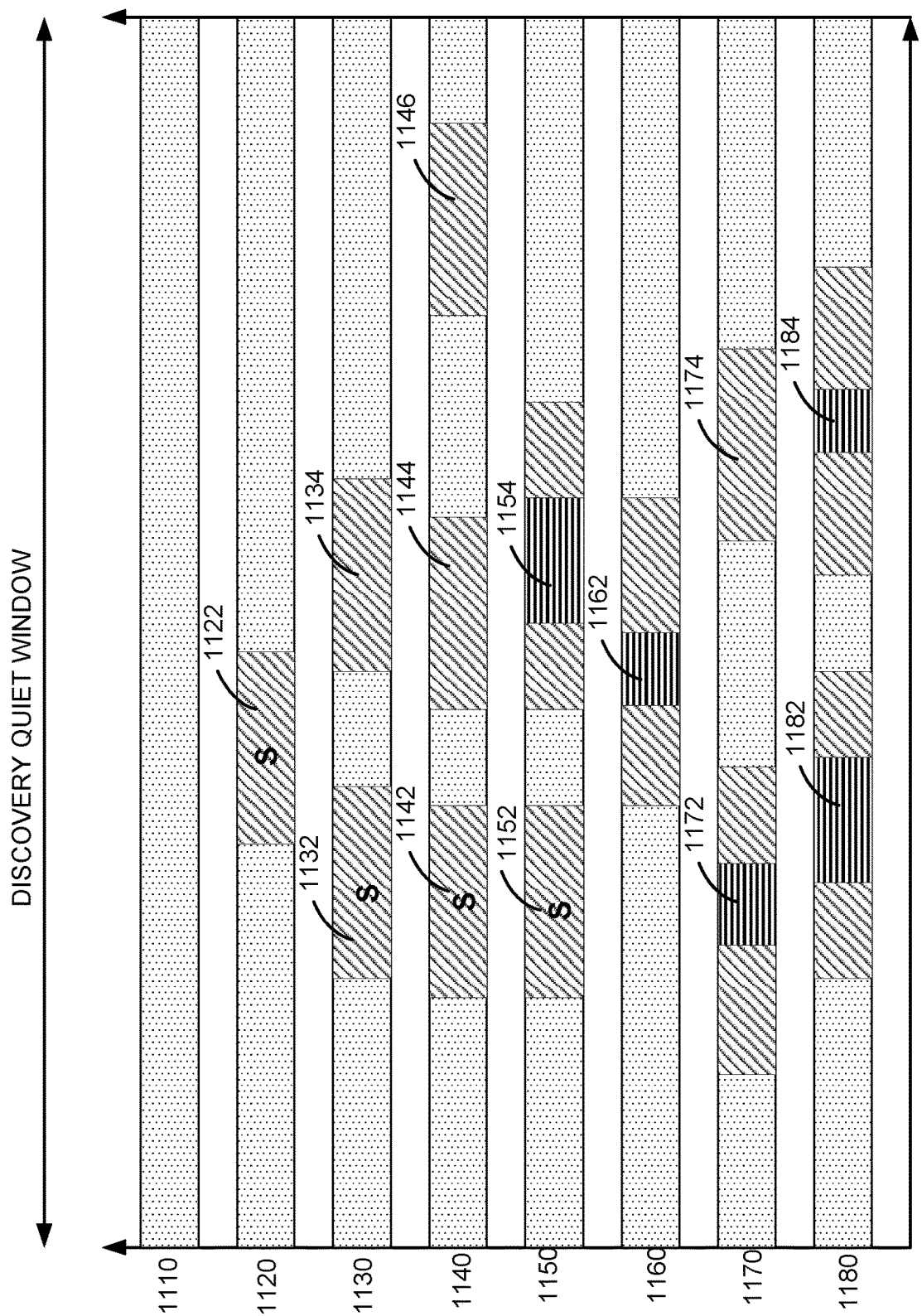
FIG. 11 illustrates the reception of exemplary data transmissions from ONUs in accordance with an exemplary implementation.

As described above, OLT CT 110 may provide activation feedback information to ONUs 140. In an exemplary implementation, after OLT 110-x transmits bandwidth allocation 240 and creates an appropriate discovery quiet window, OLT 110 may observe one of the outcome events illustrated in FIG. 11. Referring to FIG. 11, events 1110-1180 correspond to the following scenarios:

1110: No optical power corresponding to an upstream transmission is received within the discovery quiet window;

1120: A single burst of optical power (at 1122) is received within the discovery quiet window that is successfully processed as a well-formed upstream OAM message transmission (indicated by the letter S);

1130: A burst of optical power making a well-formed upstream OAM message transmission is received at 1132 followed another burst 1134, resulting in a successful well-formed upstream OAM message transmission at 1132 (indicated by the letter S);

1140: A burst of optical power making a well-formed upstream OAM message transmission is received at 1142 (indicated by the letter S) followed by two distinct bursts at 1144 and 1146 each making a well-formed upstream OAM message transmission;

1150: A burst of optical power making a well-formed upstream OAM message transmission is received at 1152 (indicated by the letter S) followed by another burst of optical power at 1154 that cannot be decoded or rendered by the receiver as a well-formed upstream OAM message transmission based on a collision;

1160: A single burst of optical power is received at 1162 within the discovery quiet window that cannot be rendered by the receiver as a well-formed upstream OAM message transmission;

1170: A single burst of optical power is received at 1172 within the discovery quiet window that cannot be rendered by the receiver as a well-formed upstream OAM message transmission based on a collision, following by another burst at 1174 making a well-formed upstream OAM message;

1180: A single burst of optical power is received at 1182 within the discovery quiet window that cannot be rendered by the receiver as a well-formed upstream OAM message transmission based on a collision following by another such burst at 1184.

These scenarios associated with data reception possibilities at OLT CT 110 are exemplary and other event outcomes may be observed by the OLT CT 110-x within a discovery quiet window. For example, three or more bursts of optical power received within the same discovery quiet window may be received, resulting in corrupted data. In addition, in one implementation, optical transceivers employed by OLT CT 110-x may not be capable of processing more than a single burst of optical power within a given interval. For example, in event 1130, which includes receiving two bursts of optical power within a same discovery quiet window, the transceiver at OLT CT 110 may process the first well-formed transmission at 1132, but may not be able to process the second well-formed transmission at 1134. That is, the transceiver may either be unable to determine whether the subsequent bursts of optical power make a well-formed transmission or are corrupted (e.g., OLT CT 110 may be unable to distinguish outcome 1130 from outcomes 1140 and 1150), or may be unable to determine the presence of subsequent bursts at all, once the first well-formed transmission has been received (e.g., to distinguish outcomes 1120, 1130, 1140, and 1150 from each other). In addition, the OLT CT 110 transceiver may be unable to receive and process any subsequent bursts of optical power, once the first detected burst of optical power represents a corrupted transmission (e.g., to distinguish outcomes 1160, 1170, and 1180).

In accordance with an exemplary implementation, activation feedback logic 420 may process events 1110-1180 as follows: Event 1110 corresponds to "No upstream transmission received"; Events 1120, 1130, 1140 and 1150 correspond to "Successful ONU-ID assignment to this ONU", when the link layer address assignment message 260 is specific to the ONU 140-x hosting the instance of the virtual stack 630 under consideration; Events 1120, 1130, 1140 and 1150 correspond to "Successful ONU-ID assignment to other ONU with interference not assessed" when OLT CT 110's transceiver is unable to distinguish among events 1120-1150; Event 1120 corresponds to "Successful ONU-ID assignment to other ONU with no interference" when the OLT CT 110's transceiver is able to distinguish event 1120 from outcomes 1130, 1140, 1150; Events 1130, 1140 and 1150 correspond to "Successful ONU-ID assignment to other ONU with one or more interferers" when the OLT CT 110's transceiver is able to distinguish these events from outcome 1120; Events 1160, 1170 and 1180 correspond to "Failure to assign ONU-ID due to collision".

Implementations described herein perform collision resolution in a PON system by providing feedback from an OLT CT or other central node to control activation-related retransmissions by ONUs. By using a same set of procedures or protocols performed at all ONUs in response to the feedback from the OLT CT/central node, each activating ONU is effectively guaranteed that ONU activation will be successful, regardless of the number of simultaneously activating ONUs. In addition, implementations described herein also reduce the average probability of collisions in each contention-based allocation associated with the user node activation function, resulting in improved efficiency in the PON.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, while series of acts have been described with respect to FIG. 8, the order of the acts may be different in other implementations. Moreover, non-dependent acts may be implemented in parallel.

To the extent the aforementioned implementations collect, store or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An optical device, comprising;
a communication interface;
a memory configured to store a value; and
processing logic configured to:
receive a broadcast contention-based allocation from an optical line terminal (OLT), wherein the contention-based allocation is associated with activation of the optical device in an optical network,
transmit a message in response to the contention-based allocation, wherein the message includes information identifying the optical device,
receive, from the OLT, at least one of an assignment message or a feedback message in response to the transmitted message,
perform, with the OLT, a ranging phase of activation of the optical device after receiving the assignment message, and
execute a retransmission procedure, in response to the feedback message indicating that a collision occurred, wherein when executing the retransmission procedure, the processing logic is configured to modify the value in response to the feedback message, wherein the value identifies a layer in a stack and is used to determine when the optical device is to retransmit the message to the OLT.

2. The optical device of claim 1, wherein when modifying the value, the processing logic is further configured to:
perform a randomized operation to modify the value.

3. The optical device of claim 2, wherein the processing logic is further configured to:
retransmit the message in response to a second contention-based allocation when the value is equal to a particular value.

4. The optical device of claim 2, wherein when modifying the value, the processing logic is further configured to:
increase the value corresponding to a lower layer associated with the stack.

5. The optical device of claim 1, wherein the optical device is one of the plurality of optical devices in the optical network and each of the optical devices is configured to execute a same retransmission procedure, and
wherein the retransmission procedure determines when each of the plurality of optical devices is to transmit an operation, administration and maintenance (OAM) message to the OLT.

6. The optical device of claim 1, wherein the processing logic is further configured to:
receive the broadcast contention-based allocation and transmit the message during a window of time associated with device activation.

7. The optical device of claim 1, wherein the message comprises an operation, administration and maintenance (OAM) message that includes a serial number of the optical device.

8. The optical device of claim 1, wherein the processing logic is further configured to:
reset the value associated with the retransmission procedure in response to receiving the assignment message from the OLT.

9. A system, comprising:
an optical line terminal (OLT) device configured to transmit a broadcast contention-based allocation associated with activation of devices in an optical network; and
a first optical network unit (ONU) configured to:
store a value,
receive the broadcast contention-based allocation,
transmit a message in response to the contention-based allocation, wherein the message includes information identifying the first ONU,
wherein the OLT device is further configured to:
broadcast an assignment message or a feedback message associated with reception of the message at the OLT device,
execute, with the first ONU, a ranging phase of activation of the first ONU after broadcasting the assignment message, and
wherein the first ONU is configured to execute a retransmission procedure, in response to the feedback message indicating that a collision occurred, wherein when executing the retransmission procedure, the first ONU is configured to modify the value in response to the feedback message, wherein the value identifies a layer in a stack and determines when the first ONU is to retransmit the message to the OLT device.

10. The system of claim 9, wherein the first ONU is further configured to:
receive the feedback message from the OLT device, and when modifying the value, the first ONU is configured to:
perform a randomized operation to modify the value.

11. The system of claim 10, wherein the first ONU is further configured to:
retransmit the message in response to a second contention-based allocation when the value is equal to a particular value.

12. The system of claim 9, wherein the OLT device is further configured to:
transmit a plurality of broadcast contention-based allocations to a plurality of ONUs for ONU activation, and
evaluate transmissions received within a window of time associated with device activation for each of the plurality of contention-based allocations.

13. The system of claim 12, wherein the OLT device is further configured to:
broadcast a feedback message associated with a response to each of the plurality of contention-based allocations.

14. The system of claim 9, further comprising:
a plurality of ONUs, wherein the plurality of ONUs include the first ONU and wherein the plurality of ONUs execute a same retransmission procedure based on the feedback message,
wherein the retransmission procedure determines when each of the plurality of ONUs is to transmit an operation, administration and maintenance (OAM) message to the OLT device.

15. The system of claim 9, wherein the message comprises an operation, administration and maintenance (OAM) message that includes a serial number of the first ONU and the first ONU is further configured to:
reset the value associated with a retransmission procedure in response to receiving the assignment message from the OLT device.

16. A method, comprising:
transmitting, by an optical line terminal (OLT) device, a contention-based allocation to a plurality of optical network units (ONUs) in a system, wherein the contention-based allocation is associated with ONU activation;
receiving, by the OLT device, at least one message from at least one of the ONUs in response to the contention-based allocation;
broadcasting a least one of an assignment message or a feedback message to the plurality of ONUs, wherein the feedback message indicates whether a collision occurred;
executing, by the OLT device and with a first one of the plurality of ONUs, a ranging phase of activating the first ONU after broadcasting the assignment message; and
executing, by the first ONU, a retransmission procedure, in response to the feedback message indicating that a collision occurred, wherein when executing the retransmission procedure, the first ONU is configured to modify a stored value in response to the feedback message, wherein the value identifies a layer in a stack and determines when the first ONU is to retransmit a message to the OLT.

17. The method of claim 16, wherein the broadcasting comprises:
broadcasting the feedback message, the method further comprising:
transmitting, by the OLT device, a second contention-based allocation, subsequent to broadcasting the feedback message.

18. The method of claim 16, wherein the feedback message includes a feedback information field, wherein the feedback information field comprises an indication of at least one of a successful reception of a message identifying one of the plurality of ONUs, an indication of a collision or an indication of no response being received at the OLT device.

19. The method of claim 16, further comprising:
broadcasting by the OLT device, a plurality of contention-based allocations; and
broadcasting, by the OLT device, a feedback message associated with each of the plurality of contention-based allocations.

20. The method of claim 16, further comprising:
resetting, by the first ONU, the value associated with a retransmission procedure in response to receiving the assignment message from the OLT device.

* * * * *